United States Patent
Riggs

[15] 3,670,330
[45] June 13, 1972

[54] RADAR COLLISION AVOIDANCE INDICATOR

[72] Inventor: Robert F. Riggs, Charlottesville, Va.
[73] Assignee: Sperry Rand Corporation
[22] Filed: July 6, 1970
[21] Appl. No.: 52,329

[52] U.S. Cl. .................................343/11 R, 343/112 CA
[51] Int. Cl. ..........................................................G01s 7/12
[58] Field of Search ..........................343/7 A, 11 R, 112 CA

[56] References Cited

UNITED STATES PATENTS 3,212,086 10/1965 Robinson ..............................343/11 R
3,267,470 8/1966 Riggs ...................................343/11 R Primary Examiner—Malcolm F. Hubler
Attorney—S. C. Yeaton

[57] ABSTRACT

A collision warning and collision avoidance radar navigation system employs combined modified tau-proximity collision warning criteria to derive an improved presentation on a radar plan position cathode ray indicator. An intruding target is labelled dangerous if the target is below a predetermined range or if the ratio of intruder closing range to his range rate is less than a predetermined value.

12 Claims, 6 Drawing Figures

INVENTOR
ROBERT F. RIGGS
BY
ATTORNEY

PATENTED JUN 13 1972

INVENTOR
ROBERT F. RIGGS
BY
H P Terry
ATTORNEY

RADAR COLLISION AVOIDANCE INDICATOR

BACKGROUND OF THE INVENTION

1. Field of the Invention

The invention pertains to radio means for early warning of potential collisions between moving vehicles and more particularly relates to means adaptable for use in azimuth scanning radar systems for generating a cathode ray display providing a readily interpretable plan position presentation of factors indicating collision possibilities.

The invention described herein was made in the course of or under a contract or subcontract thereunder with the Maritime Administration, Department of Commerce.

2. Description of the Prior Art

Various aids to marine navigation have been employed in the past as lookout assist devices for the purpose of warning of potential collisions between marine vessels and preventing such collisions. While initial detection of a possible intruder vessel has received most consideration, attention has also been directed to the nearer range problems. Systems for assessing the near-target's range, range closure rate, bearing, and bearing rate have been exploited with some degree of success.

Detection systems assessing bearing rates and range rates from data presented on radar indicators and other data have not been distinctively successful. The detection of small bearing rates at large ranges has not lent itself to accurate instrumentation. Small errors between successive bearing readings destroy the accuracy of prediction of the closest point of approach of the intruding craft.

A technique employed most often at present uses the passing distance at closest point of approach and may involve use of radar indicator reflection plotters, plotting tables, or photographic plotting systems. Of these systems, the expensive photographic plotting systems are possibly most accurate, as few errors can be introduced by the operator. Reflection plotters are also of value, since transfer of data, though manual, is done in a way negating the probability of serious errors. Errors in transfer of data by oral reporting and manual recording on plotting boards or tables can be very large. Semiautomatic transfer of radar data to plotting boards has been attempted, but the instrumentation is expensive.

Recently, complex systems employing radar data in a track-while-scan mode operating in conjunction with a computer have been developed to predict passing distance at the closest point of approach. Although these systems have improved prediction accuracy, their complexity and cost place them beyond the reach of most ship operators.

SUMMARY OF THE INVENTION

The invention is a collision probability assessment system employing a modified radar plan position display with an azimuth scanning radar system. It warns of intruding vessels and assesses the potential of collision by employment of a modified tau-proximity criterion, rather than the former closest point of approach criterion. Use of the modified tau-proximity criterion eliminates errors in the prior art systems associated with inaccurate bearing measurement. It is established that a closing-range intruder is dangerous if the magnitude of the change in the logarithm of the intruder's range between azimuth scanning sweeps of the radar antenna is greater than $2\pi/\omega k$, where $k$ is a decision threshold level and $\omega$ is the radar antenna scan frequency. According to the invention, each target echo is marked on the cathode ray tube display with an intensified trail of length $2\pi/\omega k$. For one embodiment of the invention, in which an essentially linear sweep is used for the cathode ray deflection, the intensified trail mark has a length $R_2(e^{2\pi/\omega k} - 1)$, where $R_2$ is target range. Use is made of a long persistence phosphor or a storage tube to store the intruding target's demarcations from one antenna scan to the next. The intruder may be dangerous if the trails do not overlap in range.

DESCRIPTION OF THE PREFERRED EMBODIMENT

Figure 1A:
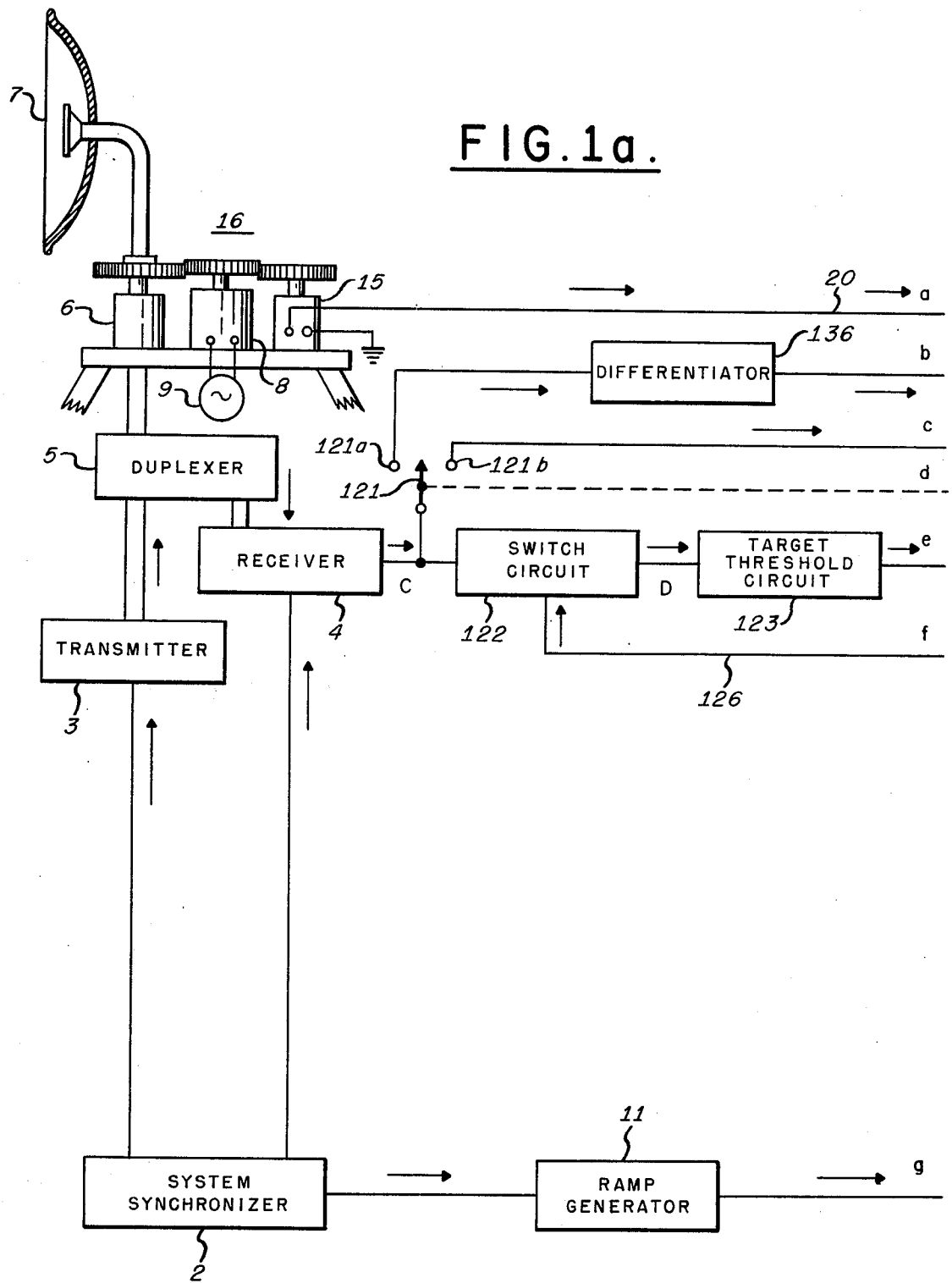
FIG. 1a and 1b are block diagrams illustrating the invention as applied in an azimuth scanning radar system.
Figure 1B:
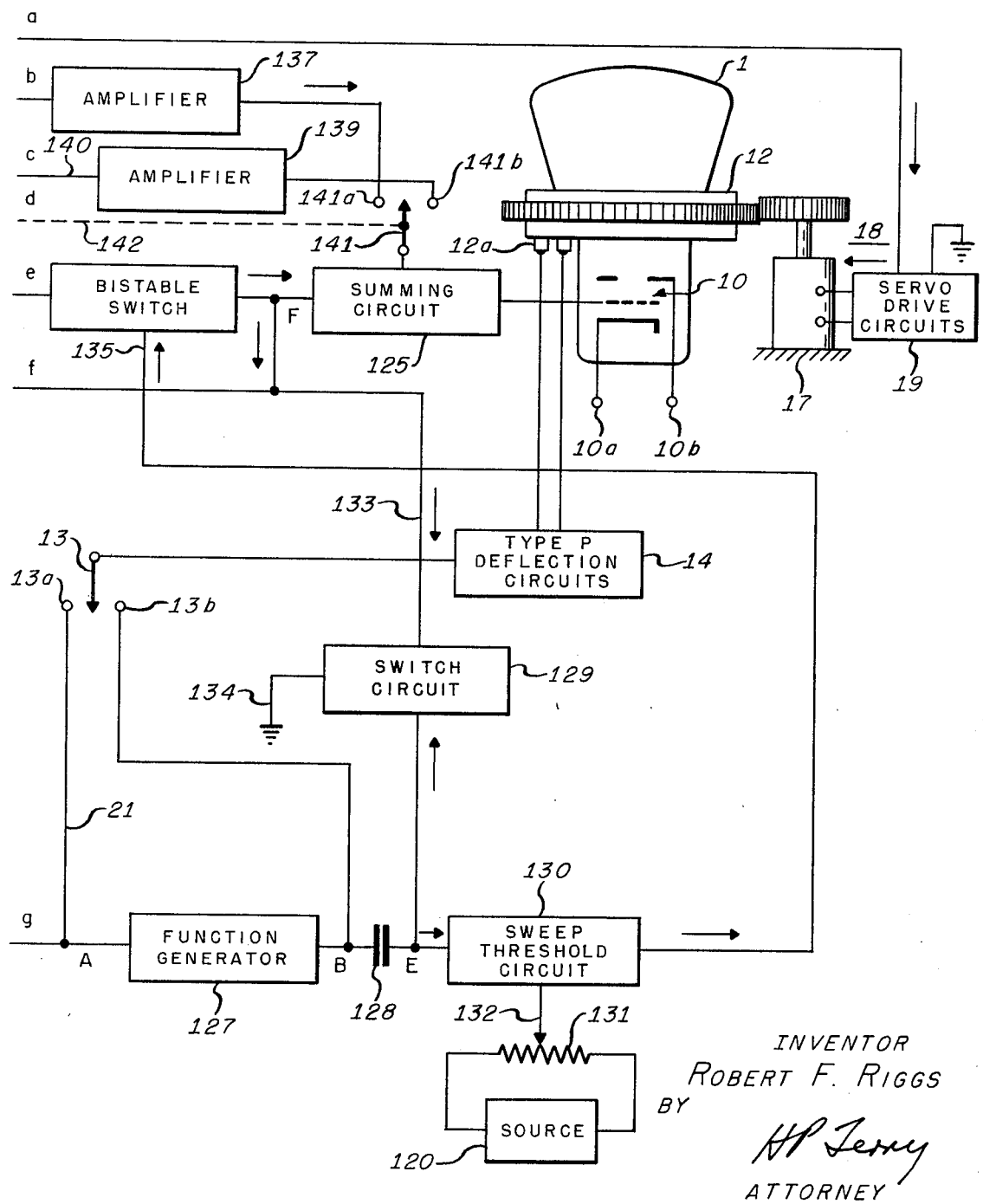

Referring to FIG. 1, a modification of a conventional azimuth scanning pulse radar system is shown providing a collision warning presentation on a conventional plan position indication cathode ray tube 1. A conventional radar synchronizer 2 provides synchronizing signals for control of the time-relations of many of the signals in the various elements of the radar system in the usual manner. For example, it synchronizes the operation of pulse radar transmitter 3 and pulse receiver 4 so that transmitter signals and echo signals respectively flow through conventional wave guide rotary joint 6 and duplexer 5 with respect to the platform-supported azimuth scanner antenna 7. In the usual operation of the radar system, the echo output C of pulse receiver 4 would conventionally be applied substantially directly to the intensifier control grid of cathode ray indicator 1.

Antenna 7 is illustrated as a conventional paraboloidal antenna, though antennas of other azimuthally directive type may be substituted for paraboloidal antenna 7. Antenna 7 is driven by motor 8 using power from source 9; it is understood that power source 9 may also be the source for supply of electrical power to all other electrical power consuming elements of the radar system, as is the usual practice. For example, power supply 9 may supply appropriate voltages to cathode terminal 10a and anode terminal 10b of indicator 1.

Synchronizer 2 also has the role of synchronizing the sweeping of the intensified electron beam over the screen of indicator 1. For example, as in conventional practice, it supplies trigger pulses to the range sweep or ramp generator 11. The sweep output A of ramp generator 11, in conventional practice, would be supplied via lead 21 when switch blade 13 contacts switch terminal 13a to conventional plan position deflection circuits 14. Indicator 1 is supplied with a conventional rotatable deflection coil yoke 12 equipped with slip rings and a pair of cooperating brushes 12a. The deflection signals from deflection circuit 14 are supplied to coil yoke 12 via brushes pair 12a and their associated slip rings. Alternatively, electric field deflection of the electron beam may be used.

Again, as in conventional practice, the plan position presentation to appear on the screen of indicator 1 is made fully possible by rotating the coil yoke 12 in synchronism with antenna 7. Such may be accomplished in any one of several known ways; FIG. 1 illustrates one known apparatus in which the antenna drive motor 8 drives a positional reference device 15 through gearing 16. The output of reference device or pick off 15 may be supplied via lead 20 to the servo drive circuits 19, which circuits may include amplifiers and other usual positional servo elements, such as feed-back elements. The position and speed errors may be employed to drive the motor 17 which, in turn, drives coil yoke 12 through gearing 18 in synchronism with the azimuth scanning of antenna 7. It will be understood from the foregoing that the relative sizes of the elements of gearing 18 in FIG. 1 have been shown merely for the convenience of making other aspects of indicator 1 clear in the drawing and that deflection yoke 12 is actually driven in synchronism with antenna 7.

The novel elements of the inventive collision avoidance radar system yet to be described solve the problem of indicating the degree of collision danger between targets appearing on the display of indicator 1. Although designed primarily for ship collision warning, it is to be understood that the same concept is applicable to aircraft collision warning or to employment in active sonar for submarine or ship collision warning. The warning system makes use of a modified tau collision warning criterion; the tau criterion has been shown in prior literature to be an effective and practical criterion for assessing likelihood of collision. In addition to the modified tau criterion, the new system employs also a proximity or guard ring type of criterion to enhance the security of the system. The combined tau-proximity collision warning criterion has intrinsic advantages over other collision warning criteria, such as prior art constant bearing concepts, because the combined tau-proximity criterion does not require extreme accuracy of the radar data, nor does its use, as will be seen, involve a complicated mathematical computation.

Figure 3:
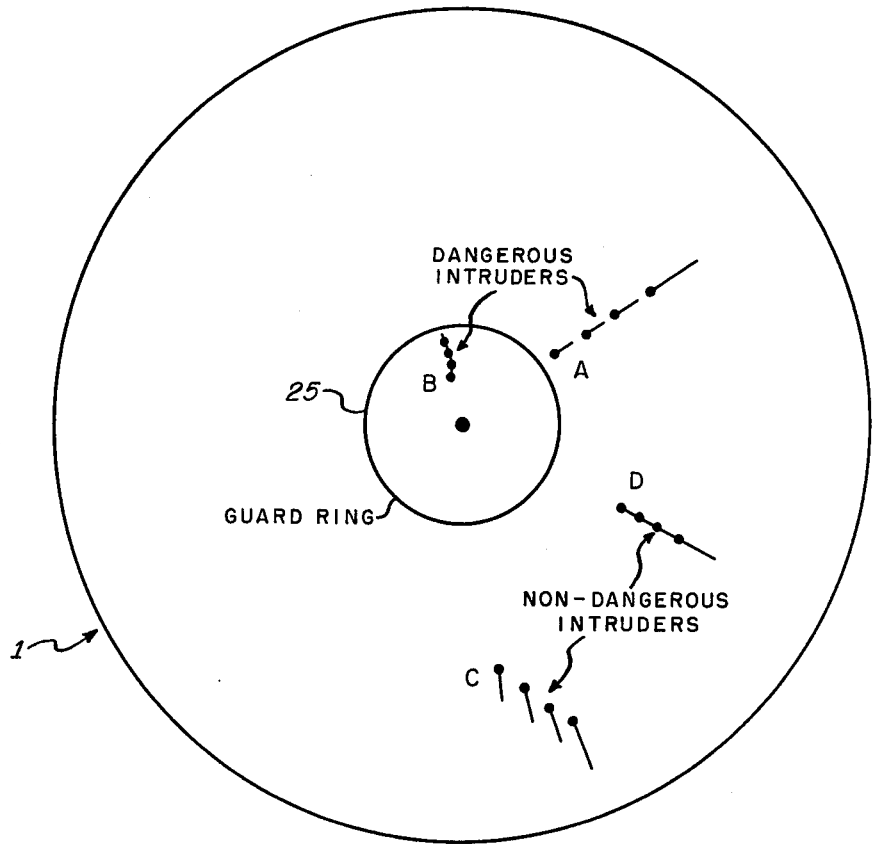
FIG. 3 is a view of the display produced by the invention, indicating intruding vessels of various degrees of collision potential.

The appearance of the display to be provided on indicator 1 is shown in FIG. 3. The combined tau-proximity warning criterion states that an intruder is dangerous if the target it at a lesser range than a dangerous guard ring range indicated on the screen by a circular line 25 (the proximity criterion), or if the intruder is closing and the ratio of intruder range to range rate is less than a critical value $k$ called the tau criterion. Target B of FIG. 3 is shown to be at less than the dangerous guard ring range and therefore represents a dangerous intruder. Target A is dangerous because it is characterized by the second criterion above. Targets C and D are not dangerous because they meet neither criterion, target C not having an appropriate bearing and target D being slow. The rate of rotation of the azimuth scanning antenna is chosen to achieve a clearly discernible separation of the intensified trails on the cathode ray display for targets indicated as dangerous according to the tau criterion. Because of resolution limitations of existing cathode ray tube indicators, a rate of rotation slower than used in the past may be employed. For example, for targets with relative motions of 20 knots and for a warning time of 20 minutes to the closest point of approach, an antenna rotation rate of about two revolutions per minute may be used.

The tau criterion states that an intruder is dangerous if:

$$\left|\frac{R}{\dot{R}}\right| < k \quad (1)$$

where $R$ is the range of the intruder, $\dot{R}$ is the range-rate of the intruder, and $k$ is the modified tau criterion or what amounts to a decision threshold parameter whose dimension is time. Consider an azimuth scanning radar system such as that of FIG. 1 whose antenna scan rate is $\omega$ radians per second. Further, consider that the intruder is moving relative to the observing radar system and is seen on successive antenna scans to have ranges $R_1$ and $R_2$ (for an approaching target, $R_1 > R_2$). Inversion and integration of the inequality 1 under these latter conditions yields:

$$|\ln R_2 - \ln R_1| > \frac{2\pi}{k\omega} \quad (2)$$

Accordingly, one objective of the invention is to test the intruder target status for an interscan range displacement in excess of $2\pi/k\omega$, which is a constant for a fixed antenna scan rate. Target A of FIG. 3, for example, has in interscan range displacement greater than $2\pi/k\omega$, as the trace is discontinuous.

The novel element of the inventive collision avoidance radar system will now be discussed, these elements being distinguished by having reference numerals in the hundreds. In the invention, the detected output C of receiver 4 in FIG. 1 is passed to switch circuit 122. For this purpose, switch blade 121 above switch circuit 122 is considered to be in the open position shown in the drawing. Switch circuit 122 is normally conducting, passing an echo pulse from any intruder target present to target threshold circuit 123. Circuit 123 is of conventional type and has a threshold level so adjusted that most clutter or noise spikes issuing from receiver 4 fall below the threshold level, while desired echo signals exceed the threshold level and are passed to bistable circuit 124, triggering circuit 124 from a first state of conduction to a second state of conduction. Bistable switch 124 is so arranged that no further echo signal will pass through it until switch 124 is returned to its first state by the agency of a signal applied via lead 135. The output F of bistable circuit 124 is coupled through summing circuit 125 to the intensifier grid 10 of indicator 1 to brighten the electron beam trace on the screen thereof. The output F of bistable circuit 124 is also fed back via lead 126 to control the switch circuit 122, switch circuit 122 being held non-conductive for the time duration of signal F. As will be seen, the signal F also has an additional function yet to be discussed.

As noted previously, system synchronizer 2 controls operation of range sweep or ramp generator 11, whose output signal may be used directly for range sweeping of the electron beam of cathode ray indicator 1. The following paragraphs will, however, assume that switch blade 13 is in contact with terminal 13b, rather than 13a. If such is the case, the linear ramp wave form output A of generator 11 is passed to function generator 127. Function generator 127 is characterized by converting an input voltage into a voltage that is the logarithm of the input voltage such that a logarithmic sweep B appears at its output. Circuits of the type having logarithmic transfer characteristics are well known, including passive circuits such as voltage divider and bridge networks incorporating contact rectifiers or copper oxide rectifiers. Suitable logarithmic amplifiers are also available, for example, in integrated circuit form. The sweep wave B is now used to drive the deflection circuits 14 and thus the trace of indicator 1.

Additionally, wave B is applied to one terminal of condenser 128, whose second terminal supplies signal E to sweep threshold circuit 130 and to switch circuit 129, to which are also coupled a lead 133 carrying wave F and a grounded lead 134. The threshold level of sweep threshold circuit 130 is controlled by the setting of tap 132 of potentiometer 131; across the latter, a source 120 of unidirectional potential is supplied. The output of sweep threshold circuit 130 is used to control the state of the bistable circuit 124 in the channel between receiver 4 and cathode ray indicator grid 10.

Figure 2:
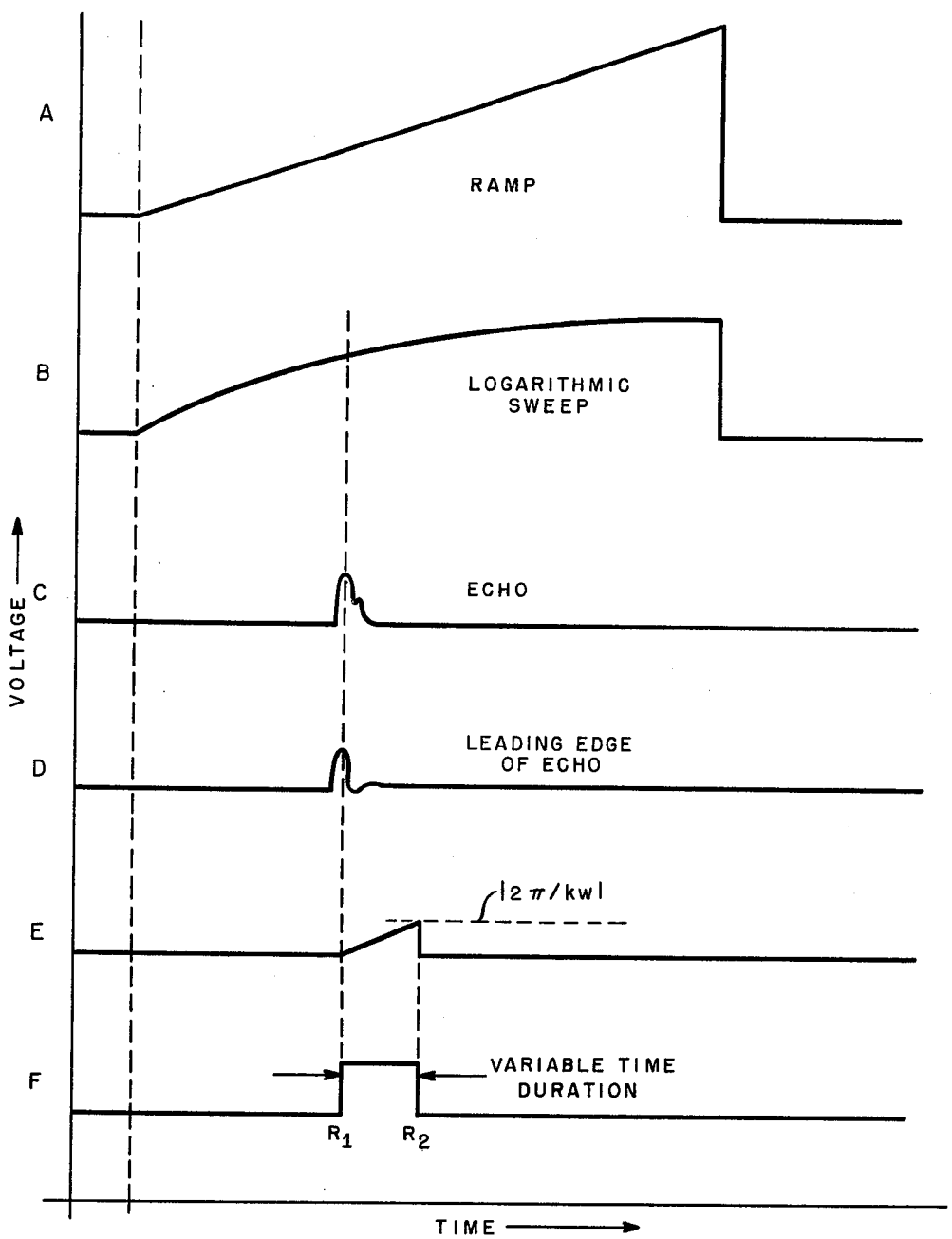
FIG. 2 is an explanatory series of graphs showing signal wave forms at various points in the apparatus of FIG. 1.

Referring to FIGS. 1 and 2, operation of the invention will be presented. As noted previously, the linear range sweep or ramp A of FIG. 2 is applied to function generator 127, which forms the logarithmic sweep wave B of FIG. 2, which wave B is, in turn, used to deflect the trace in indicator 1. When an echo C (FIG. 2) from a potential intruder is detected in receiver 4, it passes through normally conducting switch circuit 122; if it exceeds the set threshold level of target threshold circuit 123, it passes to bistable switch 124 and triggers that circuit. The output wave F (FIG. 2) of bistable circuit 124 opens switch circuit 122, so that no further detected echo signals may pass through switch 122 until bistable circuit 124 has returned to its normal (non-conducting) state.

Bistable circuit 124 also causes wave F to open the normally conducting switch circuit 129, breaking the connection 134 to ground and allowing the voltage wave E (FIG. 2) at the input of sweep threshold circuit 130 to rise with the rising logarithmic sweep wave output B of function generator 127. When the wave B flowing into sweep threshold circuit 130 exceeds a particular value according to the setting of potentiometer (131) tap 132, it is detected and is passed by threshold circuit 130 to cause bistable circuit 124 to return to its normal conducting state. Wave F causes the input of threshold circuit 130 again to be connected to ground via lead 134.

The output F (FIG. 2) of bistable circuit 124 is used to maintain bright the trace of the intensified electron beam of indicator 1, so that a trace appears on the screen of the indicator that has a fixed-length radial trace incremental excursion following the actual location on the cathode ray tube screen of the intruder echo pulse. While the time duration $R_1$ minus $R_2$ seen in wave F in FIG. 2 varies according to what point it occurs in the logarithmic sweep wave B, the actual traces seen on the indicator are of constant length because of the varying sweep rate of wave B.

The length of the incremental trace is chosen commensurate with the desired warning threshold k and the antenna scan rate $\omega$. Since $2\pi/k\omega$ represents a constant, the position of the tap 132 of potentiometer 131 is set accordingly. In the event the antenna 7 is provided with more than one selectable scan rate, a second value of $2\pi/k\omega$ is readily calibrated in terms of a corresponding setting for tap 132.

Considering again the path of signals flowing from receiver 4 to intensifier grid 10, it may be desirable to provide a distinctive characteristic to the end of the incremental trace on indicator 1 representing actual present position of the intruder. If so, this can conveniently be accomplished by allowing switch blade 121 to remain closed against contact 121b so that intruder echoes also flow in lead 140. By simultaneously closing switch blade 141 against contact 141b, such signals may flow through amplifier 139 and summing circuit 125 to grid 10. They add to the effect of the wave F by producing the enlarged present position beads shown on the incremental traces caused by intruder C, for instance, in FIG. 3. With switch blades 121 and 141 respectively closed on terminals 121a and 141a, a second or alternative circuit enhancing the bead of the intensified trace may be placed in action. This circuit comprises differentiation circuit 136 and amplifier 137.

In a second embodiment of the invention shown in FIG. 1, a linear ramp or range sweep is applied to the deflection system of indicator 1. In such a case, the range sweep is linear, but the trace increments will be of variable length. While the logarithmic range sweep has the advantage of enlarging the range scale for close targets, the function generator 127 may actually be removed from the input to deflection circuit 14 by causing switch blade 13 to contact terminal 13a. Merely the presence of switch 13 makes this alternative mode possible, a fact which illustrates the versatility of the inventive system.

The criterion of inequalities 1 and 2 may be expressed in other terms which permit the employment of a linear range sweep. For example, it is observed that inequality 1 may be rewritten in the form:

$$R_2 > e^\lambda R_1 \quad (3)$$

or, which is equivalent:

$$(R_1 - R_2) > R_2 (e^\lambda - 1) \quad (4)$$

where:

$$\lambda = 2\pi/k\omega \quad (5)$$

The criterion expressed in the inequality 3 states that an intruder is dangerous if $R_1$ (the first observed range) is greater than a constant $e^\lambda$ times $R_2$ (the second observed range). The system of FIG. 4 provides means for instrumenting such a criterion.

Figure 4:
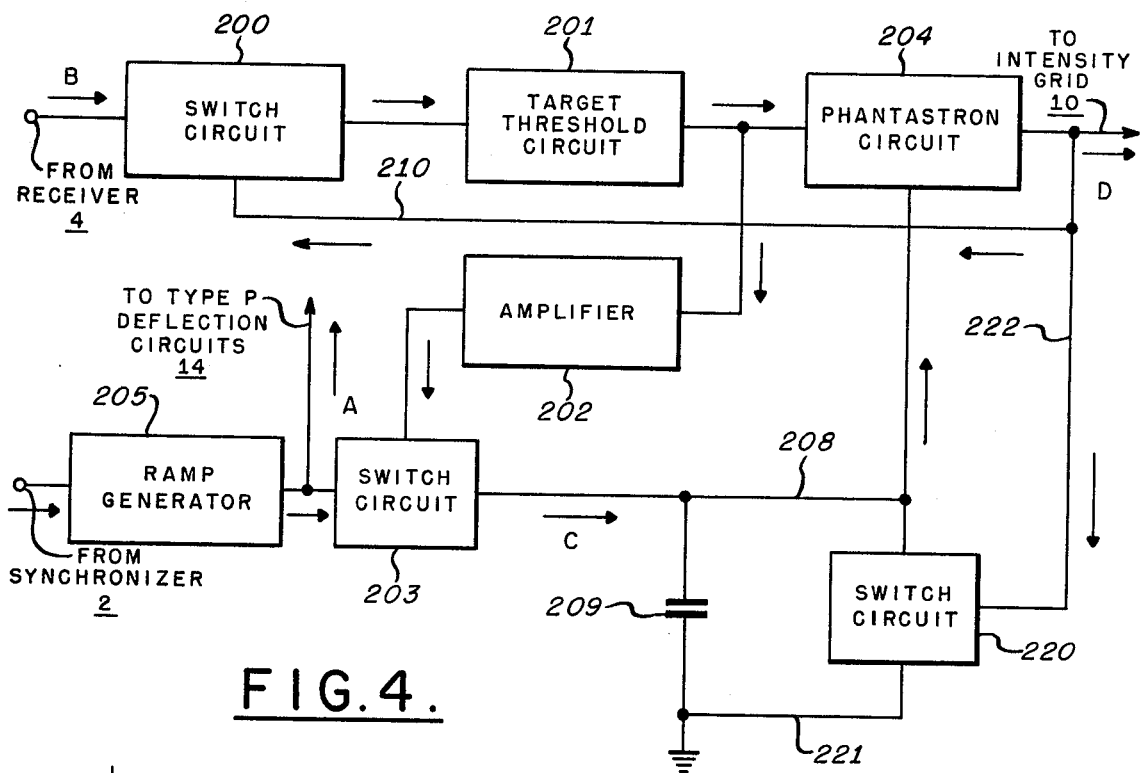
FIG. 4 is a block diagram of a preferred form of the invention.

In FIG. 4, the intruder echo B from receiver 4 of FIG. 1 is coupled to a switch circuit 200 which, when conducting, passes those echoes to target threshold circuit 201. Threshold circuit 201 may be generally similar to threshold circuits 123 and 130 of FIG. 1. The echo signals exceeding the threshold level set into circuit 201 are conducted both to an amplifier 202, which controls the yet-to-be described switch circuit 203, and also to a conventional phantastron circuit 204.

Synchronizing signals from the radar system synchronizer 2 of FIG. 1 are passed to the linear ramp or range sweep generator 205. Sweep generator 205 generates a range sweep signal A for application via lead 206 to deflection circuits such as circuit 14 of FIG. 1 for range sweeping the trace of indicator 1.

Range sweep A also goes to switch circuit 203 which may be controlled to conduct in the presence of an echo signal passing through amplifier 202 via lead 207. When switch circuit 203 momentarily conducts, its output traverses lead 208. Lead 208 is coupled to ground through capacitor 209. The output of phantastron circuit 204 is used to intensify grid 10 of indicator 1, as in FIG. 1. It is also coupled back via lead 210 to control the state of switch circuit 200. Switch circuit 200 remains non-conducting during the wave D appearing at the output of phantastron 204 so that no new echo signals B are admitted to threshold circuit 201 for the duration of wave D. The output wave D of phantastron 204 is also supplied via lead 222 to normally non-conducting switch 220, causing it to conduct and discharge condenser 220 through leads 208 and 221 at the end of the sweep trace.

Figure 5:
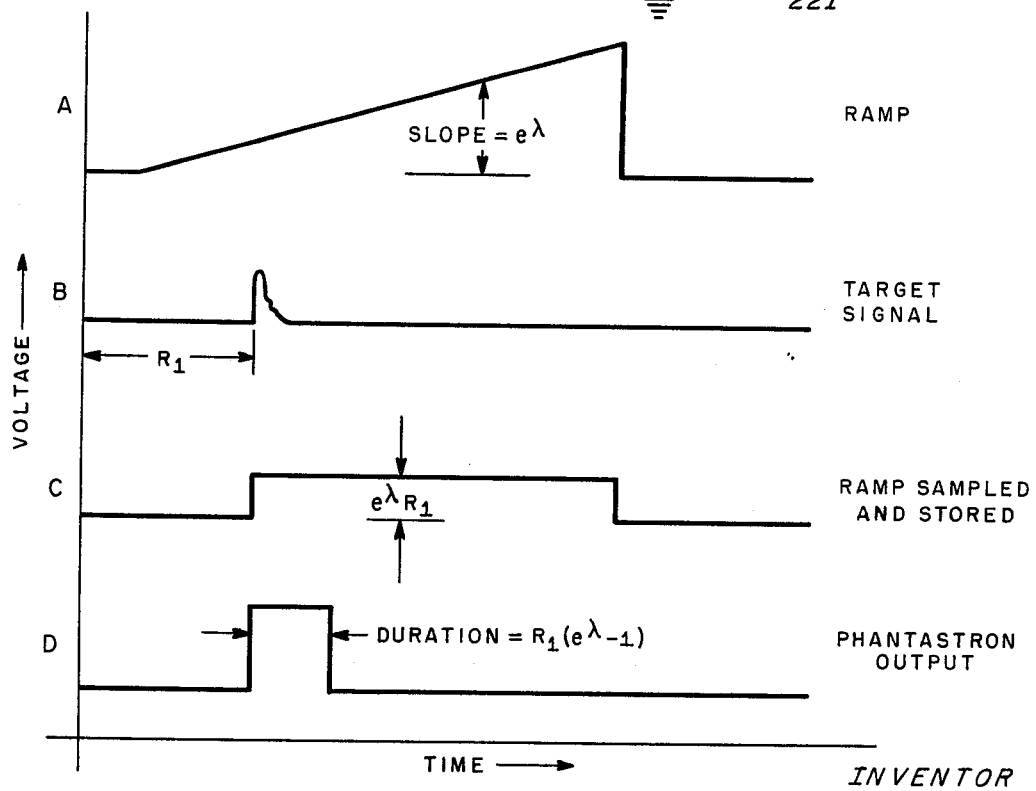
FIG. 5 is an explanatory series of graphs showing signal wave forms at various points in the equipment of FIG. 4.

Referring to FIGS. 4 and 5, the operation of the system of FIG. 4 begins when a target (wave B of FIG. 5) exceeds the threshold level of threshold circuit 201 and passes therethrough. Switch circuit 203 is normally non-conducting, but is caused to conduct momentarily by the amplified (202) version of echo B flowing on lead 207, but to conduct only for the duration of the echo pulse.

Upon conduction of switch circuit 203, the linear ramp A generated by ramp generator 205 is sampled and is stored on condenser 209 as wave C. Wave C (FIG. 5) has an amplitude $e^\lambda R_1$, the quantity $R_1$ having been introduced because of the time of the start of sampling of ramp wave A. The quantity $e^\lambda$ is determined, being a constant, by the parameters of the system, such as the size of capacitor 209.

Phantastron circuit 204 produces wave D of FIG. 5 by virtue of its inherent nature. It is a characteristic of such circuits that they are triggered into conduction by the admission of a pulse, such as echo B, and that they conduct for a time duration dependent upon a second input voltage, such as wave C of FIG. 5. Thus, the wave D is generated, being a fixed amplitude pulse of duration proportional to range $R_1$. Wave D is used to supply grid 10 of indicator 1 with an intensification signal beginning at a range proportional to $R_2$ and having a duration $R_2(e^{2\pi k\omega} - 1)$. Wave D is also supplied via lead 210 to hold switch circuit 200 non-conducting so that no further target echos may be admitted to threshold circuit 201 until phantastron circuit 204 again becomes non-conducting.

Optional displays may be exercised through the choice of the decay time employed in the phosphors of the screen of indicator 1. For example, when the enlarged head display like that for target C of FIG. 3 is used, amplifier 139 of FIG. 1 being in circuit, choice of a relatively short decay time can lead to seeing the incremental discursion only on the most recent of the traces C. On the other hand, a longer time constant phosphor (for example, provided in a second indicator like indicator 1), can store incremental discursions for all representations C.

In the instance of slowly changing closing ranges, the antenna 7 rotation rate may be reduced, and the potentiometer tap 132 may, for instance, be adjusted accordingly. Alternatively, several antenna scans may be permitted using only the conventional path 140 to the grid 10 of indicator 1. Then, the output of receiver 4 may be switched to the circuit of the present invention, followed by regular repetitions of the switching. The system may be adjusted to operate normally in the conventional plan position indication radar mode and, at the will of the operator, it may be switched to show the tau-proximity symbol for selected targets. This may be accomplished, for example, because the required operation of the invention necessitates only two successive scansions of the antenna for a warning display to be generated.

It is seen that the invention may be used beneficially for collision warning and collision prevention purposes to protect marine and other craft and may be employed to advantage in azimuth scanning radar systems employing plan position or type P indicators. It is also to be understood that the invention may be used with other types of radar systems, for example, such as airborne radar systems employing types of antenna scanners that yield type B (range versus azimuth) information on cathode ray tube displays.

The invention avoids the fundamental inaccuracies of prior art systems by use of a modified tau criterion for recognizing dangerously intruding craft. The invention avoids the possibility of fatal errors in the transfer of data from sensor systems to plotting boards or tables. The invention places a clear demarcation on successive display images of a closing target, each demarcation taking the form of a trail of predetermined length. Marking each successive target position with a trail enhances its visibility and ensures a high probability of discovery by the radar operator. The danger status of all intruders is immediately determined upon observing the display. Furthermore, dangerous intruders tend to have constant bearing tracks that will generate on the display a chain of marks pointing toward own ship's position represented by the center of the plan position display.

While the invention has been described in its preferred embodiments, it is to be understood that the words which have been used are words of description rather than limitation and that changes within the purview of the appended claims may be made without departure from the true scope and spirit of the invention in its broader aspects.

I claim:

1. In a radar indicator system wherein an echo signal is represented by intensification of a cathode ray beam of said indicator and said system provides synchronizing signals for synchronizing the start of the range sweep wave for sweeping said cathode ray beam, means for intensifying said beam comprising:
threshold circuit means for selectively passing said echo signals only when greater than a predetermined amplitude,
intensifier pulse generator means connected to said threshold circuit means, adapted to initiate an intensifier pulse upon receipt of said selected echo signal,
means for supplying said intensifier pulse to said indicator to intensify said cathode ray beam of said indicator,
storage means for storing a selected portion of said range sweep wave,
switch means controlled by said threshold circuit means for determining the time period of storage of said selected portion, and
means for applying the output of said storage means to said intensifier pulse generator for terminating said intensifier pulse.

2. Apparatus as described in claim 1 comprising:
summation circuit means having first, second, and third terminals,
means for applying said intensifier pulse to said first terminal,
amplifier means for supplying said echo signal to said second terminal, and
means for connecting said third terminal to said indicator to intensify said cathode ray beam of said indicator according to the combined output of said summation circuit means.

3. Apparatus as described in claim 1 comprising:
summation circuit means having first, second, and third terminals,
means for applying said intensifier pulse to said first terminal,
differentiation circuit means for applying a modified version of said echo signal to said second terminal, and
means for connecting said third terminal to said indicator to intensify said cathode ray beam of said indicator according to the combined output of said summation circuit means.

4. Apparatus as described in claim 1 wherein said storage means comprises capacitor means.

5. Apparatus as described in claim 1 wherein said storage means comprises:
capacitor means, and
sweep threshold circuit means,
said capacitor means having an output terminal coupled to said switch means and to said sweep threshold circuit means, and
said sweep threshold circuit means being adapted to control said intensifier pulse generator means.

6. Apparatus as described in claim 5, wherein the threshold operating voltage of said sweep threshold circuit means is controlled by a control signal proportional to $2\pi/k\omega$, where
$k =$ the tau criterion, and
$\omega =$ antenna scan rate in scansions per unit time.

7. Apparatus as described in claim 1, wherein said intensifier pulse generator means comprises:
normally conducting switch means, connected to the input of said threshold circuit means, for receiving said echo signal,
pulse circuit means connected to the output of said threshold circuit means, and
means for coupling the output of said pulse circuit means to said normally conductive switch means for rendering same non-conducting.

8. Apparatus as described in claim 7 wherein said pulse circuit means is so constructed and arranged as to produce an intensifier pulse of duration in proportion to $R_2(e^{2\pi k\omega} - 1)$ where
$k =$ the tau criterion,
$\omega =$ antenna scan rate in scansions per unit time,
$R_2 =$ target range.

9. Apparatus as described in claim 7 wherein said pulse circuit means comprises phantastron circuit means.

10. Apparatus as described in claim 9 comprising:
capacitive storage means having first and second terminals,
said capacitive storage means being connected by said first terminal to said switch means,
said storage means being connected by one of said terminals to said phantastron circuit means for terminating cathode ray beam intensifier pulses generated thereby, and
means for discharging said capacitive storage means.

11. Apparatus as described in claim 9 wherein said phantastron circuit is so constructed and arranged as to produce an intensifier pulse of duration in proportion to $e^\lambda$ where:
$\lambda = 2\pi/k\omega$,
and where:
$k =$ the tau criterion, and
$\omega =$ antenna scan rate in scansions per unit time.

12. In a plan position indicator radar system wherein an echo signal is represented by intensification of a cathode ray beam of said indicator and said system provides synchronizing signals for synchronizing the start of the radial range sweep wave for said cathode ray beam, means for intensifying said beam comprising:
first switch means having an input and an output,
means for applying said echo signal to said input,
pulse generator means responsive to said output for generating a pulse for intensifying said cathode ray beam,
means for supplying said intensifier pulse to said first switch means for rendering it non-conductive for the duration of said intensifier pulse,
second switch means having an input and an output,
means for applying said range sweep wave to said input of said second switch means,
storage means,
means for applying said echo to the input of said second switch means for rendering the latter conducting during said echo and for sampling said range sweep,
means coupling said output of said second switch to said storage means, and
means coupling said stored signal to said pulse generator means for determining the duration of said pulse for intensifying said cathode ray beam.

* * * * *